(12) United States Patent
Huang

(10) Patent No.: US 7,923,991 B2
(45) Date of Patent: Apr. 12, 2011

(54) SIGNAL TESTING APPARATUS

(75) Inventor: Fa-Sheng Huang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 214 days.

(21) Appl. No.: 12/354,781

(22) Filed: Jan. 16, 2009

(65) Prior Publication Data
US 2010/0164522 A1   Jul. 1, 2010

(30) Foreign Application Priority Data
Dec. 27, 2008   (CN) .......................... 2008 1 0306573

(51) Int. Cl.
*G01R 31/28* (2006.01)
(52) U.S. Cl. ...................................... 324/158.1
(58) Field of Classification Search .................. None
See application file for complete search history.

(56) References Cited

U.S. PATENT DOCUMENTS
7,696,956 B2 * 4/2010 Deng et al. ............... 345/10

* cited by examiner

*Primary Examiner* — Roberto Velez
(74) *Attorney, Agent, or Firm* — Zhigang Ma

(57) ABSTRACT

A signal testing apparatus includes a number of first switches, a second switch, and a testing terminal. Each first switch includes a static contact, a first dynamic contact, and a second dynamic contact. The second switch includes a static contact and a number of dynamic contacts. When the static contact and the first dynamic contact of each first switch are connected to each other, a computer interface is connected to a peripheral equipment interface. When the static contact and the second dynamic contact of each first switch are connected to each other, the computer interface is disconnected to the peripheral equipment interface, the static contact of the second switch is capable of selectively connected to one of the dynamic contacts of the second switch, to selectively test a signal output from a corresponding pin of the computer interface.

8 Claims, 2 Drawing Sheets

SIGNAL TESTING APPARATUS

BACKGROUND

1. Technical Field

The present disclosure relates to testing apparatuses and, particularly, to a signal testing apparatus for a host computer interface (HCI).

2. Description of the Related Art

Generally, a host computer interface (HCI), such as a digital visual interface (DVI), a video graphics array (VGA) interface, an universal serial bus (USB) interface, or a high definition multimedia interface (HDMI), and so on, needs a signal integrity test in order to assure that a peripheral equipment connected thereto can work normally. An ordinary signal testing method for the HCI includes exporting signals from the HCI to a signal testing apparatus, and then using a testing probe, such as an oscillograph probe, to test the signals.

However, the signals output from the HCI generally need to be modified, for example, signals output from the VGA interface need to be modified in order to modify resolution of a display. The display should be connected to the VGA interface during modification of the resolution of the display. Therefore, the signal testing apparatus and the display are repeatedly plugged in and unplugged out of the VGA interface. Repeated plugging and unplugging are time-consuming and will shorten the service life of the HCI and the probe, and also easily result in poor contact between the HCI and the probe, thereby making the signal integrity test of the signals output from the HCI inaccurate.

DETAILED DESCRIPTION

Figure 1:
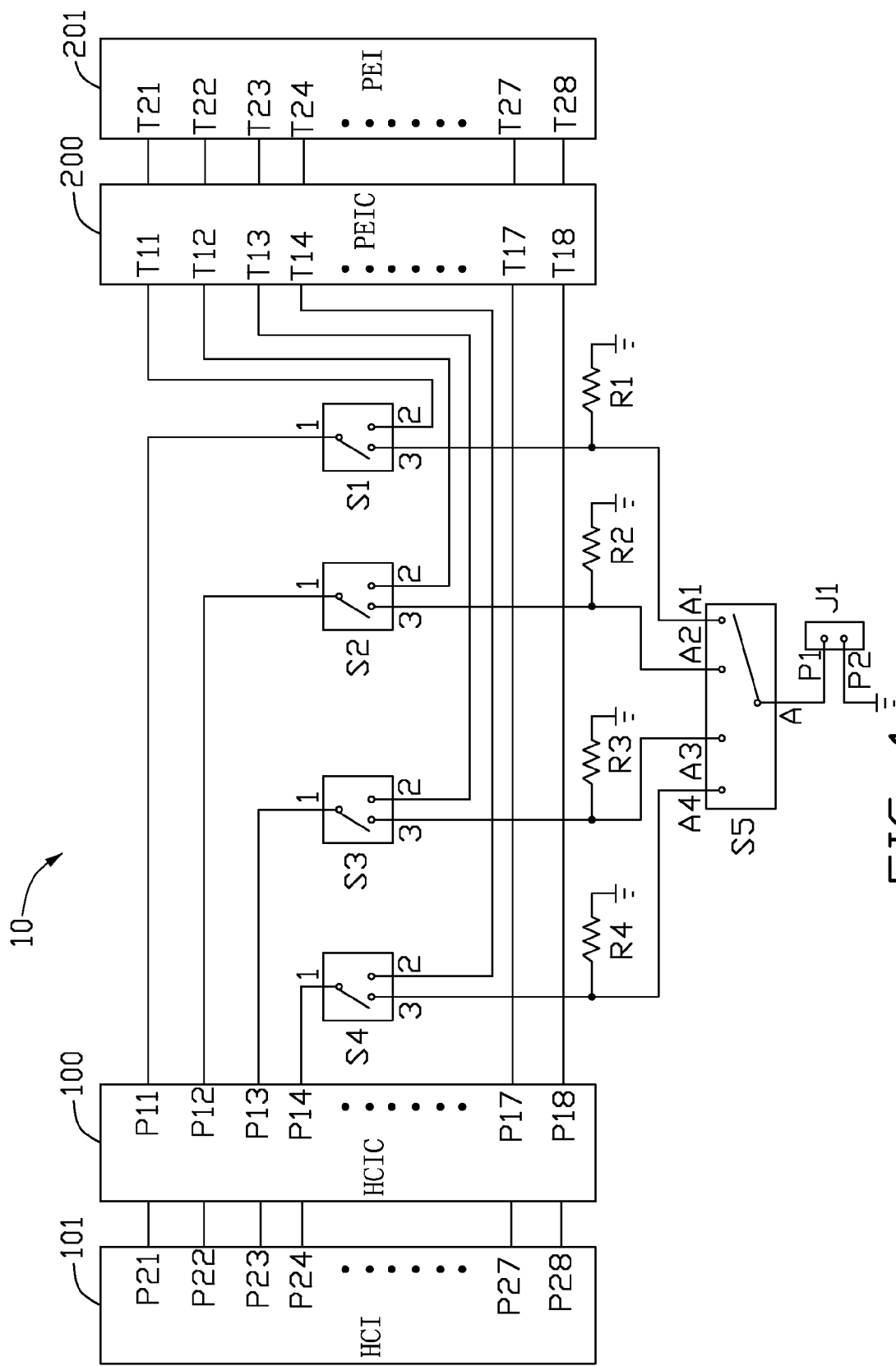
FIG. 1 is a circuit diagram of an exemplary embodiment of a signal testing apparatus.

Referring to FIG. 1, an exemplary embodiment of a signal testing apparatus 10 for testing signals from a host computer interface (HCI) 101 includes a host computer interface connector (HCIC) 100, a peripheral equipment interface connector (PEIC) 200, five switches S1-S5, four resistors R1-R4, and a testing terminal J1.

The HCIC 100 is configured for connecting to the HCI 101. The PEIC 200 is configured for connecting to a peripheral equipment interface (PEI) 201 adapted to the HCI 101. In one exemplary embodiment, the HCIC 100 includes eight pins P11-P18, respectively connected to eight pins P21-P28 of the HCI 101. The PEIC 200 includes eight pins T11-T18, respectively connected to eight pins T21-T28 of the PEI 201. Signals output from the pins P21-P24 of the HCI 101 are to be tested by the signal testing apparatus 10.

Each of the switches S1-S4 is a single-pole-double-throw switch and includes a static contact 1, a first dynamic contact 2, and a second dynamic contact 3. The switch S5 is a single-pole-four-throw switch and includes a static contact A, and four dynamic contacts A1-A4. The static contacts 1 of the switches S1-S4 are correspondingly connected to the pins P11-P14 of the HCIC 100. The first dynamic contacts 2 of the switches S1-S4 are correspondingly connected to the pins T11-T14 of the PEIC 200. The second dynamic contacts 3 of the switches S1-S4 are correspondingly connected to the four dynamic contacts A1-A4 of the switch S5.

First ends of the resistors R1-R4 are correspondingly connected to the second dynamic contacts 3 of the switches S1-S4. Second ends of the resistors R1-R4 are grounded. The resistors R1-R4 are termination resistors, configured for preventing the signals output from the pins P21-P24 of the HCI 101 from reflecting. The static contact A of the switch S5 is connected to a first testing point P1 of the testing terminal J1. A second testing point P2 of the testing terminal J1 is grounded. In one exemplary embodiment, the testing terminal J1 is an inserter having two pins functioning as the first testing point P1 and the second testing point P2. The other pins P25-P28 of the HCI 101 are correspondingly connected to the pins T25-T28 of the PEI 201 via the pins P15-P18 of the HCIC 100 and the pins T15-T17 of the PEIC 200.

When the static contacts 1 of the switches S1-S4 are correspondingly connected to the second dynamic contacts 3 of the switches S1-S4, the signals output from the pins P21-P24 of the HCI 101 are transmitted to the four dynamic contacts A1-A4. The static contact A of the switch S5 can be selectively connected to one of the dynamic contacts A1-A4 to select one of the pins P21-P24 for a signal integrity test. For example, when the pin P21 of the HCI 101 is selected to be tested, the static contact A of the switch S5 is connected to the dynamic contact A1, then an oscillograph probe (not shown) is connected to the testing terminal J1 to test the signal output from the pin P21 of the HCI 101.

When the signals output from the pins P21-P24 of the HCI 101 need to be modified, for example, a resolution of a display (not shown) connected to the PEI 201 is modified thereby modifying the signal output from the pins P21-P24 of the HCI 101, the static contact 1 and the first dynamic contact 2 of each of the switches S1-S4 are correspondingly connected to each other. Therefore, pins P21-P24 of the HCI 101 are correspondingly connected to the pins T21-T24 of the PEI 201 via the pins P11-P14 of the HCIC 100 and the pins T11-T14 of the PEIC 200. The HCI 101 and the PEI 201 are thus assured to work normally. When the signals output from the pins P21-P24 of the HCI 101 are modified, the static contact 1 and the second dynamic contact 3 of each of the switches are connected to each other, thereby the modified signals output from the unmeasured pins P21-P24 of the HCI can be tested via the oscillograph probe.

Figure 2:
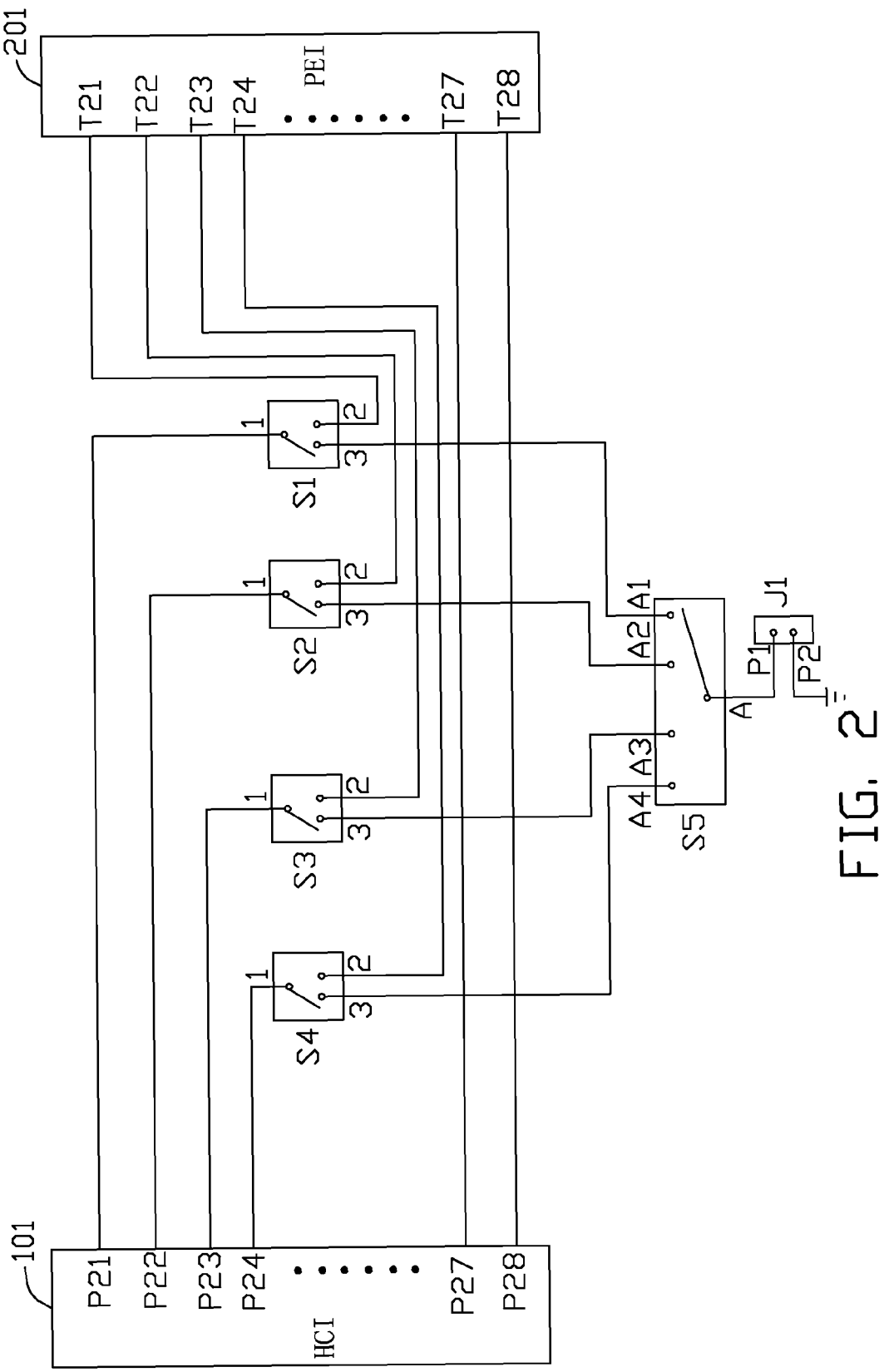
FIG. 2 is a circuit diagram of another exemplary embodiment of a signal testing apparatus.

Referring to FIG. 2, in another exemplary embodiment, the HCIC 100, the PEIC 200, and the resistors R1-R4 can be omitted to save on cost.

It is to be understood, however, that even though numerous characteristics and advantages of the present disclosure have been set forth in the foregoing description, together with details of the structure and function of the disclosure, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A signal testing apparatus for testing signals output from a plurality of pins of a host computer interface (HCI), comprising: a plurality of first switches, each of the plurality of first switches comprising: a static contact capable of correspondingly connecting to one of the plurality of pins of the HCI; a first dynamic contact correspondingly connected to one of a plurality of pins of a peripheral equipment interface (PEI) adapted to the HCI; and a second dynamic contact; a second switch comprising: a static contact; and a plurality of dynamic contacts correspondingly connected to the second dynamic contacts of the plurality of first switches; and a testing terminal comprising: a first testing point connected to the static contact of the second switch; and a grounded second testing point; wherein the plurality of pins of the HCI are correspondingly connected to the plurality of pins of the PEI in response to the static contact and the first dynamic contact of each of the plurality of first switches being connected to each other; and wherein the pins of the HCI are correspondingly connected to the plurality of dynamic contacts of the second switch in response to the static contact and the second dynamic contact of each of the plurality of first switches being connected to each other; thereby the static contact of the second switch is capable of being selectively connected to one of the plurality of dynamic contacts of the second switch to test the signal output from the corresponding one of the plurality of pins of the HCI.

2. The signal testing apparatus of claim 1, wherein the second dynamic contact of each of the plurality of first switches is grounded via a resistor.

3. The signal testing apparatus of claim 2, wherein the resistor is a termination resistor.

4. The signal testing apparatus of claim 1, wherein the static contacts of the plurality of the first switches are capable of connecting to the pins of the HCI via a host computer interface connector.

5. The signal testing apparatus of claim 1, wherein the first dynamic contacts of the plurality of first switches are capable of connecting to the plurality of pins of the PEI via a peripheral equipment interface connector.

6. The signal testing apparatus of claim 1, wherein each of the plurality of first switches is a single-pole-double-throw switch.

7. The signal testing apparatus of claim 1, wherein the second switch is a single-pole-multi-throw switch.

8. The signal testing apparatus of claim 1, wherein the testing terminal is an inserter comprising two pins functioning as the first testing point and the second testing point.

* * * * *